(12) United States Patent
Matsushita

(10) Patent No.: US 7,368,626 B2
(45) Date of Patent: May 6, 2008

(54) METHOD OF ISOMERIZING HYDROCARBON

(75) Inventor: Koichi Matsushita, Toda (JP)

(73) Assignee: Japan Energy Corporation, Tokyo (JP)

( * ) Notice: Subject to any disclaimer, the term of this patent is extended or adjusted under 35 U.S.C. 154(b) by 614 days.

(21) Appl. No.: 10/508,649

(22) PCT Filed: Mar. 17, 2003

(86) PCT No.: PCT/JP03/03182

§ 371 (c)(1),
(2), (4) Date: Sep. 17, 2004

(87) PCT Pub. No.: WO03/080768

PCT Pub. Date: Oct. 2, 2003

(65) Prior Publication Data

US 2005/0222480 A1    Oct. 6, 2005

(30) Foreign Application Priority Data

Mar. 27, 2002    (JP)    ............. 2002-087443

(51) Int. Cl.
C07C 5/22    (2006.01)
(52) U.S. Cl. ..................... 585/750; 585/751

(58) Field of Classification Search ........... 585/750, 585/751
See application file for complete search history.

(56) References Cited

U.S. PATENT DOCUMENTS 5,719,097 A    2/1998    Chang et al.

FOREIGN PATENT DOCUMENTS

| JP | 9-38494 | 2/1997 |
| JP | 9-308827 | 12/1997 |
| JP | 11-244701 | 9/1999 |

*Primary Examiner*—Thuan Dinh Dang
(74) *Attorney, Agent, or Firm*—Flynn, Thiel, Boutell & Tanis, P.C.

(57) ABSTRACT

A hydrocarbon isomerization method of making hydrocarbons containing at least 50 wt. % of saturated hydrocarbons having 7 and 8 carbon atoms (so-called heavy naphtha) come into contact, in the presence of hydrogen, with a solid acid catalyst containing a platinum group metal component supported on a carrier that contains as metal components at least one group IV metal component selected from the group consisting of titanium, zirconium and hafnium and at least one group VI metal component selected from the group consisting of tungsten and molybdenum. In particular, the isomerization method is preferably carried out at a temperature in a range of 190 to 250° C. and a pressure in a range of 0.8 to 10 MPa and, as the catalyst, it is preferable to use a solid acid catalyst in which the carrier further contains aluminum as a metal component.

7 Claims, 1 Drawing Sheet

METHOD OF ISOMERIZING HYDROCARBON

TECHNICAL FIELD

The present invention relates to an isomerization method of converting saturated hydrocarbons, in particular straight-chain saturated hydrocarbons, having 7 and 8 carbon atoms into branched saturated hydrocarbons having the same number of carbon atoms.

BACKGROUND ART

Spark-ignited internal combustion engine liquid fuel, i.e. so-called gasoline, is generally manufactured by blending together petroleum fractions obtained by distilling crude oil, or gasoline bases obtained by processing such petroleum fractions. Hydrocarbons contained in a gasoline generally have approximately 4 to 10 carbon atoms.

Octane number is a typical gasoline performance index. Out of bases having as a principal component thereof hydrocarbons having 7 or more carbon atoms, modified gasoline bases (reformates) having as a principal component thereof aromatic hydrocarbons having 7 to 9 carbon atoms such as toluene are used as gasoline bases exhibiting a high octane number.

For a gasoline base that has as a principal component thereof hydrocarbons having 5 and 6 carbon atoms and exhibits a high octane number, a manufacturing method involving an isomerization process is known. This is a method in which the octane number is increased by isomerizing straight-chain saturated hydrocarbons into branched saturated hydrocarbons, this being because straight-chain saturated hydrocarbons exhibit a low octane number, whereas branched saturated hydrocarbons having the same number of carbon atoms exhibit a high octane number. As catalysts used in such an isomerization process, (1) solid acid catalysts in which sulfuric groups are supported on zirconia, and (2) solid acid catalysts that use a zeolite, are known.

DISCLOSURE OF THE INVENTION

In the case that there are demands to reduce the amount of aromatic hydrocarbons in gasoline as an environmental measure, out of gasoline bases having as a principal component thereof hydrocarbons having 7 or more carbon atoms, the amount blended in of the above-mentioned modified gasoline bases must be reduced, but as a result, the amount mixed in of saturated aliphatic hydrocarbons, which have a lower octane number than aromatic hydrocarbons, increases relatively, and hence the octane number of the gasoline base obtained drops. As one method of making up for this drop in octane number, studies have been carried out into isomerizing straight-chain saturated hydrocarbons, which make up a large part of the saturated aliphatic hydrocarbons, into branched saturated hydrocarbons.

In the present invention, a method of isomerizing hydrocarbons containing saturated hydrocarbons having 7 and 8 carbon atoms (so-called heavy naphtha) is proposed.

The present inventors discovered that, in the case of using a specified isomerization catalyst, isomerization can be carried out efficiently by carrying out a reaction with the composition of the raw material limited, thus accomplishing the present invention.

The hydrocarbon isomerization method according to the present invention is a method of making hydrocarbons containing at least 50 wt. % of saturated hydrocarbons having 7 and 8 carbon atoms come into contact, in the presence of hydrogen, with a solid acid catalyst comprising a platinum group metal component supported on a carrier that contains as metal components at least one group IV metal component selected from the group consisting of titanium, zirconium and hafnium and at least one group VI metal component selected from the group consisting of tungsten and molybdenum. The isomerization method is preferably carried out at a temperature in a range of 190 to 250° C., and at a pressure in a range of 0.8 to 10 MPa and, moreover, as the catalyst, it is preferable to use a solid acid catalyst in which the carrier contains aluminum as a metal component.

Upon carrying out studies into the reactivity of the specified catalyst used in the present invention, it was found that if hydrocarbons containing both hydrocarbons having 6 or fewer carbon atoms and hydrocarbons having 7 and 8 carbon atoms are isomerized using the catalyst, under the condition in which the hydrocarbons having 6 or fewer carbon atoms are selectively isomerized, the hydrocarbons having 7 or 8 carbon atoms crack and the isomerization reaction hardly takes place at all for them. The present inventors surmised that this is because, with such a reaction, cations having 3 or fewer carbon atoms that are produced when branched hydrocarbons having 6 or fewer carbon atoms crack are unstable, whereas isobutyl cations that are produced when branched hydrocarbons having 7 and 8 carbon atoms crack are stable, and hence the hydrocarbons having 7 or more carbon atoms are readily cracked.

The present inventors tried separating off the hydrocarbons having 7 and 8 carbon atoms, and reacting them using the above-mentioned catalyst, and discovered that, surprisingly, isomerization becomes possible while suppressing cracking of these hydrocarbons, thus accomplishing the present invention.

Specifically, the present invention consists in:

1. A hydrocarbon isomerization method of making hydrocarbons containing at least 50 wt. % of saturated hydrocarbons having 7 and 8 carbon atoms come into contact, in the presence of hydrogen, with a solid acid catalyst comprising a platinum group metal component supported on a carrier that contains as metal components at least one group IV metal component selected from the group consisting of titanium, zirconium and hafnium and at least one group VI metal component selected from the group consisting of tungsten and molybdenum.

2. The hydrocarbon isomerization method according to 1 above, wherein the isomerization reaction is carried out at a temperature in a range of 190 to 250° C.

3. The hydrocarbon isomerization method according to 1 above, wherein the isomerization reaction is carried out at a pressure in a range of 0.8 to 10 MPa.

4. The hydrocarbon isomerization method according to 1 above, using a solid acid catalyst in which the carrier further contains aluminum as a metal component.

5. The hydrocarbon isomerization method according to 1 above, wherein reaction products obtained through the hydrocarbon isomerization method according to 1 above are separated into a fraction containing predominantly branched hydrocarbons and a fraction containing predominantly straight-chain hydrocarbons, and the fraction containing predominantly straight-chain hydrocarbons is taken as a raw material.

According to the present invention, by efficiently isomerizing saturated hydrocarbons having 7 and 8 carbon atoms, a base having a high octane number can be obtained at a high yield and, as a result, the aromatic component in a gasoline can be reduced without bringing about a drop in the operational performance of gasoline engines.

Solid Acid Catalyst

The solid acid catalyst used in the present invention comprises a platinum group metal component(s) supported on a carrier that contains as metal components at least one group IV metal component selected from the group consisting of titanium, zirconium and hafnium and at least one group VI metal component selected from the group consisting of tungsten and molybdenum. Zirconium is preferable as the group IV metal component, and tungsten is preferable as the group VI metal component. The content of the group IV metal component(s) in the catalyst is preferably 10 to 72 wt. %, particularly preferably 20 to 60 wt. %, in terms of the weight of the metallic element(s). Moreover, the content of the group VI metal component(s) in the catalyst is preferably 2 to 30 wt. %, particularly preferably 5 to 20 wt. %, more preferably 10 to 15 wt. %, in terms of the weight of the metallic element(s). It is preferable for the carrier to be substantially constituted from metal oxides. Note, however, that 'metal oxides' is defined as including hydrated metal oxides.

In addition to the oxides, which may be oxides including hydrated oxides, the carrier may contain another metal component(s) such as boron, magnesium, aluminum, silicon, phosphorus, calcium, vanadium, chromium, manganese, iron, cobalt, nickel, copper, zinc, gallium, germanium, yttrium, niobium, tin, lanthanum and cerium, either alone or as a mixture, or as a composite metal oxide(s) such as a zeolite(s). In particular, the catalyst carrier preferably contains 3 to 30 wt. %, particularly preferably 5 to 25 wt. %, of aluminum in terms of the weight of elemental aluminum. Furthermore, to improve the performance of the acid catalyst, a halogen(s) can be included as required. The catalyst does not necessarily have to contain a sulfureous component, but in the case of containing a sulfureous component, the proportion of the sulfureous component in the catalyst is generally not more than 0.1 wt. % in terms of the weight of elemental sulfur. The sulfureous component can be supported, for example, by contacting a sulfur-containing acidic compound with the support followed by heat treatment at a temperature of higher than 300° C. but lower than 800° C. As such a sulfur-containing acidic compound, there can be mentioned, for example, sulfuric acid, ammonium sulfate, sulfurous acid, ammonium sulfite, and thionyl chloride and these compounds may be used as they are or as a solution such as an aqueous solution.

It is preferable for a zirconia component, which is a group IV metal component, to substantially comprise tetragonal zirconia. This can be verified by powder X-ray diffraction, specifically from the diffraction peak of tetragonal zirconia at 2θ=30.20 using CuKα radiation. It is preferable that the zirconia component be crystallized to such a degree as to confirm the crystallization by the diffraction peak, and no monoclinic zirconia be contained. Specifically, the ratio (S28/S30) of the area of the diffraction peak for monoclinic zirconia at 2θ=28.20 (S28) to the area of the diffraction peak for tetragonal zirconia at 2θ=30.20 (S30) is preferably not more than 1.0, particularly preferably not more than 0.05. Moreover, in the case that an alumina component is present in the carrier, it is preferable for the alumina to be crystalline, with it being particularly preferable for the alumina to substantially comprise γ-alumina.

The solid acid catalyst of the present invention contains at least one metal selected from the group consisting of platinum group metals. Here, platinum group metals are platinum, palladium, ruthenium, rhodium, iridium and osmium. It is preferable to use platinum, palladium or ruthenium, particularly preferably platinum. The proportion of the platinum group metal component(s) in the catalyst (the mean of the platinum group metal component concentration) is preferably 0.01 to 10 wt. %, particularly preferably 0.05 to 5 wt. %, more preferably 0.1 to 2 wt. %, in terms of the weight of the metallic element(s). It is undesirable for the platinum group metal component content to be too low, since then the catalytic performance improving effect will be low. It is undesirable for the platinum group metal component content to be too high, since this will bring about a drop in the specific surface area and the pore volume of the catalyst.

It is preferable for the platinum group metal component(s) to be crystallized. This can be verified by powder X-ray diffraction through the distinct diffraction peaks of the platinum group metal(s); specifically, in the case that the area of a diffraction peak produced by a sufficiently crystallized platinum group metal is taken as 100%, it is preferable for a peak of area at least 30%, particularly preferably at least 50%, to be exhibited at the same position. Moreover, the crystallite diameter of the platinum group metal(s) is preferably not more than 10 nm, particularly preferably 1 to 10 nm.

The specific surface area of the solid acid catalyst is preferably 50 to 500 $m^2/g$, particularly preferably 60 to 300 $m^2/g$, more preferably 70 to 200 $m^2/g$. The specific surface area can generally be measured using the known BET method. The pore structure of the solid acid catalyst of the present invention can be measured by a nitrogen adsorption method for a pore diameter range of 0.002 to 0.05 μm, and by a mercury porosimetry for a pore diameter range of 0.05 to 10 μm. The pore volume for a pore diameter range of 0.002 to 10 μm is preferably at least 0.2 $cm^3/g$, particularly preferably 0.25 to 1.0 $cm^3/g$. The median pore diameter in a pore diameter range of 0.002 to 0.05 μm is preferably 50 to 200 Å, particularly preferably 70 to 150 Å.

Preferably, the solid acid catalyst is not a powder, but rather has a 'pellet' shape; pellets of size 0.5 to 20 mm can easily be obtained, and generally a mean particle diameter of 0.5 to 20 mm is preferably used, particularly preferably 0.6 to 5 mm. The mechanical strength of the catalyst is at least 1.0 kg, more preferably at least 2.0 kg, in terms of the side crushing strength of cylindrical pellets of diameter 1.5 mm.

Method of Manufacturing the Catalyst

There are no particular limitations on the method of manufacturing the solid acid catalyst, but to give an example, a manufacturing method can be used in which the group VI metal compound(s) is/are added to a powder (hereinafter referred to as the 'precursor powder') of a hydrated metal oxide(s) and/or metal hydroxide(s) that constitutes a precursor of the metal oxide(s) that is/are the group IV metal component(s) in the carrier, and kneading, shaping and calcining are carried out to produce the carrier, and then the platinum group metal(s) is/are supported on the carrier. Hereinafter description will be given for this method, but the order of shaping/calcining the carrier, mixing in the group VI metal component(s), supporting the platinum group metal(s) and so on can be modified.

Precursor Powder of Group IV Metal Oxide

The precursor powder of the oxide(s) of the group IV metal(s) selected from titanium, zirconium and hafnium becomes the metal oxide(s) constituting the carrier through calcination after shaping; the precursor powder may be manufactured in any way, but generally can be obtained by neutralizing or hydrolyzing metal salt(s), organometallic compound(s) or the like, washing and drying. Zirconium hydroxide (including the hydrated oxide) is preferably used as the group IV metal component precursor powder. It is preferable to add a hydrated alumina such as boehmite to the precursor powder. Furthermore, a composite metal hydroxide(s) and/or composite metal hydrated oxide(s) can also be used in the precursor powder. The amount added of the group IV metal oxide precursor powder is preferably such that the content of the group IV metal component(s) in the solid acid catalyst ultimately obtained is 10 to 72 wt. %, particularly preferably 20 to 60 wt. %, in terms of the weight of the metallic element(s).

Group VI Metal Compound(s)

Examples of the group VI metal compound(s) are oxides, chlorides, sulfates, nitrates and so on of tungsten or molybdenum, but a heteropolyacid of tungsten or molybdenum is preferably used, and a tungstate or molybdate is most preferably used. The group VI metal compound(s) may be used as is, or as a solution such as an aqueous solution. The group VI metal compound(s) may be in a solid or liquid state, and there are also no particular limitations on the concentration of a solution, with it being possible to prepare the solution while considering the amount of solution required for the kneading and so on. The amount added of the group VI metal compound(s) is preferably made to be such that the content of the group VI metal component(s) in the solid acid catalyst ultimately obtained is 2 to 30 wt. %, preferably 5 to 20 wt. %, particularly preferably 10 to 15 wt. %, in terms of the weight of the group VI metallic element(s).

Kneading

There are no particular limitations on the kneading method, with it being possible to use a kneader generally used in catalyst preparation. In general, it is preferable to use a method in which the raw materials are put into the kneader, a solvent such as water is added, and kneading is carried out using agitating blades, but there are no particular limitations on the order of putting in the raw materials and additives. During the kneading, water is generally added as the abovementioned solvent, but an organic solvent such as ethanol, isopropanol, acetone, methyl ethyl ketone, or methyl isobutyl ketone may be added. The temperature during the kneading and the kneading time vary according to the precursor powder of hydrated metal oxide(s) and/or metal hydroxide(s) that constitutes a raw material and sulfur-containing compound(s), but there are no particular limitations so long as these conditions are such that a preferable pore structure can be obtained. Similarly, acids such as nitric acid, bases such as ammonia, organic compounds, metal salts, ceramic fibers, surfactants, zeolites, clays, and so on may be added when carrying out the kneading, so long as this is within a range such that the properties of the catalyst of the present invention are maintained.

Shaping

There are no particular limitations on the method of shaping after kneading, with it being possible to use a shaping method generally used in catalyst preparation. In particular, it is preferable to use extrusion shaping using a screw extruder or the like, since shaping into a desired shape such as pellets or a honeycomb can be carried out efficiently. There are no particular limitations on the size of the shaped article, but in general the shaping is carried out to a size such that the length of the cross-section of the shaped article is 0.5 to 20 mm. For example, in the case of cylindrical pellets, in general, ones having a diameter of 0.5 to 10 mm and a length of approximately 0.5 to 15 mm can be obtained easily.

Calcining After Shaping

After the shaping, calcining is carried out in an atmosphere of a gas such as air or nitrogen, although it is particularly preferable to carry out the calcining in air. The calcining temperature varies according to the other calcining conditions such as the calcining time and the gas circulation rate, but is generally 400 to 900° C., preferably 500 to 800° C. The calcining time varies according to the other calcining conditions such as the calcining temperature and the gas circulation rate, but is preferably 0.05 to 20 hours, particularly preferably 0.1 to 10 hours, more preferably 0.2 to 5 hours.

Supporting of Platinum Group Metal(s)

The supporting of the platinum group metal(s) on the calcined carrier can be carried out by preparing a supporting liquid containing the platinum group metal(s), and then impregnating the supporting liquid into the carrier. Chloroplatinic acid, dichlorotetraammine platinum, tetrachlorohexaammine platinum, and so on can be used in the supporting liquid. Regarding the metal component(s) that can be selected as the platinum group metal component(s), platinum, palladium, ruthenium and so on are preferably used, with it being particularly preferable to use platinum. Moreover, the platinum group metal component(s) may contain other group metal component(s). It is preferable to add these metal compound(s) such that the total amount of the platinum group metal component(s) in the solid acid catalyst is 0.01 to 10 wt. %, particularly preferably 0.05 to 5 wt. %, more preferably 0.1 to 2 wt. %, in terms of the weight of the metallic element(s).

There are no particular limitations on the method of impregnating the supporting liquid, but this can be carried out by spraying, immersion or the like. After the impregnation, stabilization is generally carried out by drying, calcining and so on. The calcining temperature varies according to the other calcining conditions, such as the calcining time, but is generally preferably 300 to 800° C., particularly preferably 400 to 800° C., more preferably 500 to 700° C. The calcining time varies according to the other calcining conditions such as the temperature, but is generally preferably 0.05 to 20 hours, particularly preferably 0.1 to 10 hours, more preferably 0.2 to 5 hours. It is preferable to carry out the calcining at the same temperature as or a higher temperature than the temperature of heat treatment such as calcining in the step of manufacturing the catalyst carrier. The drying and calcining are carried out in an atmosphere of a gas such as air or nitrogen, although it is particularly preferable to carry out the drying and calcining in air. It is preferable to carry out reduction in a stream of air containing hydrogen.

Isomerization Reaction

As the hydrocarbons that constitute the raw material of the isomerization reaction of the present invention, hydrocarbons in which the total amount of saturated hydrocarbons having 7 and 8 carbon atoms accounts for at least 50 wt. %, preferably at least 70 wt. % of the entire raw material are used. Other components than the hydrocarbons having 7 and 8 carbon atoms in the raw material are hydrocarbons having 9 or more carbon atoms. Since hydrocarbons having 6 or less carbon atoms can be isomerized by other easier known reaction procedures than that of this invention, they are separated from the raw material to be used in the isomerization of this invention and treated in a separate process.

Therefore, the raw material for the isomerization of this invention is substantially free from hydrocarbons having 6 or less carbon atoms and the inclusion of such hydrocarbons is less than 10 wt. %. As the raw material hydrocarbons used in this invention, a heavy naphtha fraction obtained from crude oil using a topping plant or a fluidized catalytic cracker, or if necessary a fraction obtained by further distillation separation of such a heavy naphtha fraction, can be used. Moreover, a saturated hydrocarbon oil synthesized through coal liquefaction or from natural gas, or a hydrocarbon oil obtained by cracking such a saturated hydrocarbon oil, can also be taken as the raw material.

The temperature of the isomerization reaction is preferably 190 to 250° C., particularly preferably 200 to 225° C. At below such a temperature range, the isomerization reaction does not substantially proceed and if such a temperature range is exceeded, then cracking primarily takes place. A preferable range of the LHSV (liquid hourly space velocity) is 0.2 to 10/hr, and a preferable range of the hydrogen/raw material ratio is one such that the amount of hydrogen is at least that required to saturate unsaturated components (olefin components, aromatic components) contained in the hydrocarbon raw material, with 0.01 to 10 mol/mol being particularly preferable.

The amount of moisture present during the isomerization reaction is preferably small. The amount of moisture in the hydrocarbons is preferably not more than 15 ppm, more preferably not more than 10 ppm, particularly preferably not more than 5 ppm. The amount of moisture in the hydrogen is preferably not more than 15 ppm, more preferably not more than 10 ppm, particularly preferably not more than 5 ppm. At such a range, cracking of the hydrocarbons is suppressed, and hence the branched hydrocarbon yield and the liquid yield increase.

The isomerization reaction is carried out under a pressure of preferably 0.8 to 10 MPa, particularly preferably 1.0 to 8 MPa, more preferably 2 to 4 MPa. At below such a range, the hydrocarbons will become prone to being cracked, and hence the liquid yield will drop.

It is possible to separate the reaction products obtained from the hydrocarbon isomerization method into a fraction containing predominantly branched hydrocarbons and a fraction containing predominantly straight-chain hydrocarbons, and then carry out further isomerization taking the fraction containing predominantly straight-chain hydrocarbons as the raw material. An example of the isomerization reaction apparatus is shown in FIG. 1. A hydrocarbon raw material 10 and supplied hydrogen 11 are both introduced into a dehydrating apparatus 20 to reduce the amount of moisture, and are then introduced into a first reactor 30 charged with the catalyst, where the isomerization is carried out. The products from the first reactor 30 are separated in a separation column 40 into an unreacted component 41 that has not been isomerized and contains predominantly straight-chain hydrocarbons, a gasoline base 42 that has been isomerized and contains predominantly branched hydrocarbons, and a gas component 43 that contains hydrogen, and also methane, ethane and so on that have been produced through cracking of the hydrocarbons. The unreacted component 41 is mixed into the hydrocarbon raw material 10, and hence is recycled, once again becoming a raw material of the isomerization reaction. The gasoline base 42 is blended with other bases, whereby a gasoline product is manufactured. The gas component 43 is separated in a hydrogen separation column into a hydrocarbon gas 51 and hydrogen 52 to be recycled, and the recycled hydrogen 52 is mixed into the supplied hydrogen 11 and hence reused. Note that instead of recycling the unreacted component 41, it is also possible to separately provide a second reactor (not shown) charged with the catalyst, and further carry out isomerization of the unreacted component 41 here.

BEST MODE FOR CARRYING OUT THE INVENTION

Figure 1:
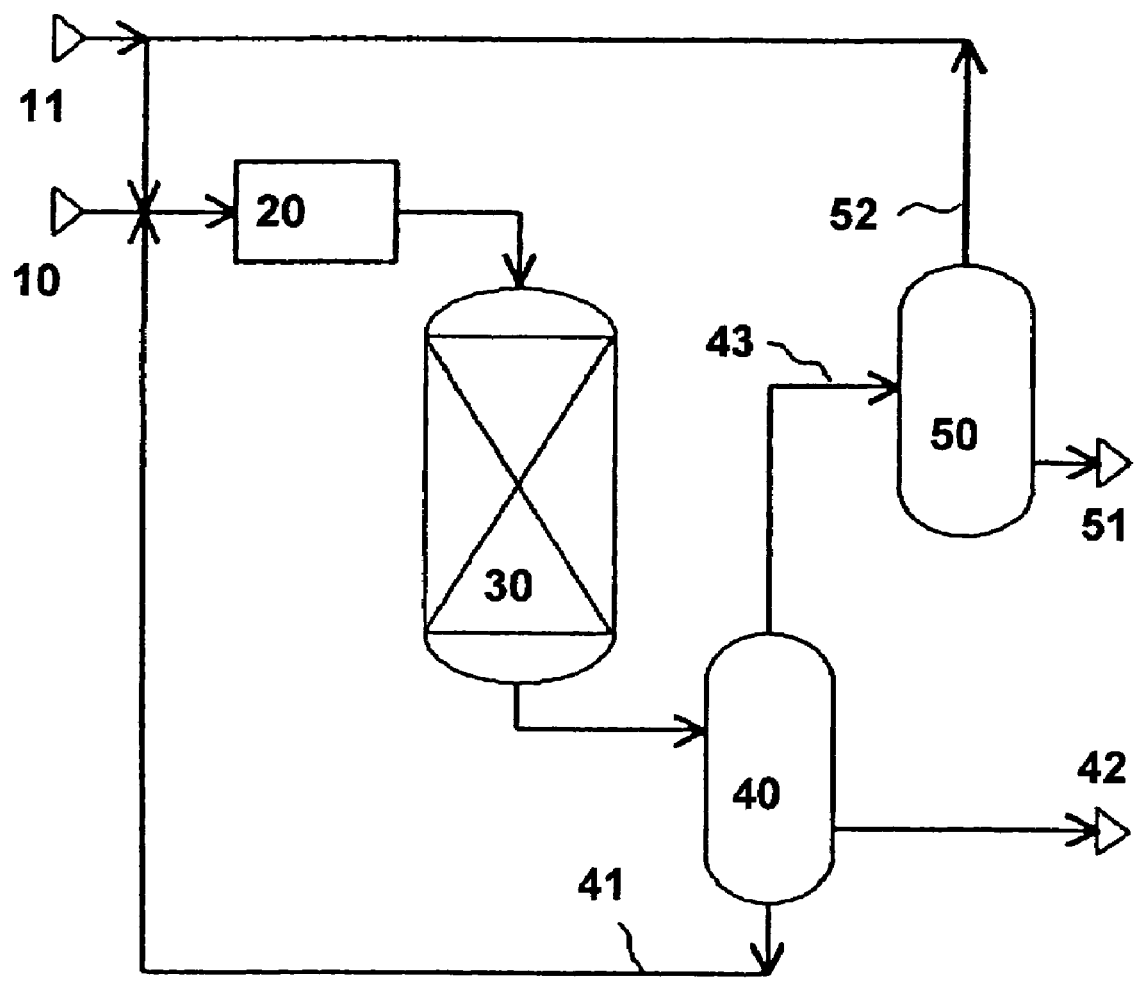
FIG. 1 is a drawing showing an embodiment of an isomerization reaction apparatus.

Following is a more detailed description through examples.

Method of Measuring Mean Particle Diameter of Agglomerate of Particles

Measurement was carried out by a wet measurement method using a Microtrac particle size analyzer made by Nikkiso Co., Ltd. With this method, the powder is dispersed in water, a laser beam is irradiated onto the flowing agglomerated particles, and particle size analysis is carried out using the forward-scattered light.

Method of Measuring Pore Structure

The specific surface area and the pore structure for a pore diameter range of 0.002 to 0.05 µm were measured by a nitrogen adsorption method using an ASAP 2400 measuring apparatus made by Micromeritics. For a pore diameter range of 0.05 to 10 µm, measurement was carried out by a mercury porosimetry using an AutoPore 9200 measuring apparatus made by Micromeritics.

Method of Measuring Mean Crushing Strength

The side crushing strength was measured using a sample obtained by extruding into a cylindrical shape, drying and calcining, using a tablet crushability tester "TH-203CP" made by Toyama Sangyo Co., Ltd. A measuring probe having a circular tip of 4.5 mm diameter was used. The operation of carrying out the measurement by pushing the measuring probe against the center of the side of the cylindrical sample was repeated 20 times, and the mean was calculated.

Preparation of Catalyst

A powder of mean particle diameter of 1.5 µm obtained by drying commercially sold dry zirconium hydroxide was used as a hydrated zirconia powder. Moreover, a commercially sold pseudo-boehmite powder having a mean particle diameter of 10 µm was used as a hydrated alumina powder. 912 g of the hydrated alumina powder was added to 1544 g of the hydrated zirconia powder, 808 g of ammonium metatungstate was further added, and kneading was carried out using a kneader equipped with agitating blades for 45 minutes while adding water. The kneaded material obtained was extruded using an extruder having a circular opening of 1.6 mm diameter to form cylindrical pellets, and then drying was carried out at 110° C., thus obtaining dry pellets. Next, some of the dry pellets were calcined at 800° C. for 1.5 hours, thus obtaining a carrier A.

The carrier A thus formed consisted of cylindrical shapes of 1.4 mm mean diameter and 4 mm mean length, and the mean crushing strength was 1.9 kg. The specific surface area of the carrier A was 101 $m^2$/g, and the pore volume for a pore diameter range of 0.002 to 10 µm was 0.32 ml/g. The median pore diameter in a pore diameter range of 0.002 to 0.05 µm for the carrier A was 105 Å.

An aqueous solution of chloroplatinic acid ($H_2PtCl_6$) was supported onto 125 g of the carrier A by spraying such that the amount of platinum in the catalyst would be 0.5 wt. %. Drying was carried out, and then calcining was carried out at 680° C. for 0.5 hours, thus obtaining approximately 125 g of a catalyst A.

For the catalyst A, the mean crushing strength was 2.1 kg, the proportion of zirconia in the catalyst A was 38.0 wt. % in terms of the weight of elemental zirconium, the proportion of alumina was 13.0 wt. % in terms of the weight of elemental aluminum, the proportion of the tungstate component was 12.5 wt. % in terms of the weight of elemental tungsten, and the proportion of a nitrogen component was not more than 0.01 wt. %. Moreover, the specific surface area of the catalyst A was 100 $m^2/g$, the pore volume for a pore diameter range of 0.002 to 10 μm was 0.31 ml/g, and the median pore diameter in a pore diameter range of 0.002 to 0.05 μm was 104 Å.

Heavy Naphtha Isomerization Reaction 4 cc of the catalyst (catalyst A) that had been graded to get granules passable through a 16-24 mesh sieve was charged into a fixed-bed flow type reactor of 50 cm length and inside diameter of 1 cm and, after pretreatment, a hydrocarbon isomerization reaction was carried out. The pretreatment was carried out for 1 hour in an air atmosphere at normal pressure and at a temperature of 400° C. After that, without introducing air, the inside of the reactor was made to be a nitrogen atmosphere, and was then made to be a hydrogen atmosphere, and then the isomerization reaction was commenced.

Normal heptane (n-C7) was used as the hydrocarbon constituting the raw material of the reaction. In the raw material used, the concentration of sulfur compounds was not more than 1 ppm by weight in terms of sulfur, the concentration of nitrogen compounds was not more than 0.1 ppm by weight in terms of nitrogen, the concentration of oxygen compounds other than water was not more than 0.1 ppm by weight in terms of oxygen, and the concentration of chlorine compounds was not more than 0.1 ppm by weight in terms of chlorine.

Moreover, regarding the hydrogen gas used in the reaction, the purity was 99.99 vol. %, the concentration of water was not more than 0.5 ppm by weight and, as other impurities, the concentration of sulfur compounds was not more than 1 ppm by weight in terms of sulfur, the concentration of nitrogen compounds was not more than 0.1 ppm by weight, the concentration of oxygen compounds other than water was not more than 0.1 ppm by weight in terms of oxygen, and the concentration of chlorine compounds was not more than 0.1 ppm by weight in terms of chlorine.

The isomerization reaction was carried out at a reaction pressure of 0.5 to 5.0 MPa, an LHSV of 2.0/hr, and a hydrogen/oil ratio ($H_2$/oil) of 5 (mol/mol). The composition at the outlet of the reaction tube 200 hours after the initiation of the oil flow was analyzed by gas chromatography. Evaluation was carried out by taking the percentage by weight in the reaction products of components other than the raw material of the reaction as the conversion rate, the percentage by weight in the reaction products of components having 5 or more carbon atoms as the liquid yield, the percentage by weight in the reaction products of components having 4 or fewer carbon atoms as the cracked product yield, and the percentage by weight in the reaction products of branched aliphatic hydrocarbons having 5 or more carbon atoms as the iso-C5+ yield. Also, the percentage by weight in the reaction products of branched aliphatic hydrocarbons having 7 carbon atoms was evaluated as the iso-C7 yield.

The evaluation results in the case of making the reaction temperature be 220° C. and changing the reaction pressure are shown in Table 1. From Table 1, it can be seen that at 1.0 MPa and above, there is little cracking, and the liquid yield is high. The conversion rate is highest at around 3.6 MPa, and the conversion rate and the yields drop slightly at 5.0 MPa.

TABLE 1

| Reaction pressure (MPa) | 0.5 | 1.0 | 3.6 | 5.0 |
|---|---|---|---|---|
| Reaction temperature (° C.) | 220 | 220 | 220 | 220 |
| Conversion rate (%) | 67 | 70 | 75 | 62 |
| Liquid yield (wt. %) | 88 | 95 | 93 | 91 |
| Cracked product yield (wt. %) | 12 | 5 | 7 | 9 |
| iso-C5+ yield (wt. %) | 55 | 65 | 67 | 53 |
| iso-C7 yield (wt. %) | 55 | 65 | 67 | 53 |

The evaluation results in the case of making the reaction pressure be 3.6 MPa or 5.0 MPa and changing the reaction temperature are shown in Tables 2 and 3. At a reaction temperature of 160° C. or 180° C., the isomerization hardly proceeds at all. At 200° C. and above, the reaction proceeds but at 230° C. cracking becomes prone to occurring and hence the liquid yield drops.

TABLE 2

| Reaction pressure (MPa) | 3.6 | 3.6 | 3.6 | 3.6 | 3.6 |
|---|---|---|---|---|---|
| Reaction temperature (° C.) | 160 | 180 | 200 | 220 | 230 |
| Conversion rate (%) | 9 | 12 | 44 | 75 | 88 |
| Liquid yield (wt. %) | 100 | 100 | 99 | 93 | 68 |
| Cracked product yield (wt. %) | 0 | 0 | 1 | 7 | 32 |
| iso-C5+ yield (wt. %) | 9 | 12 | 43 | 67 | 56 |
| iso-C7 yield (wt. %) | 9 | 12 | 43 | 67 | 56 |

TABLE 3

| Reaction pressure (MPa) | 5.0 | 5.0 | 5.0 | 5.0 | 5.0 |
|---|---|---|---|---|---|
| Reaction temperature (° C.) | 160 | 180 | 200 | 220 | 230 |
| Conversion rate (%) | 8 | 8 | 32 | 62 | 87 |
| Liquid yield (wt. %) | 100 | 100 | 99 | 91 | 65 |
| Cracked product yield (wt. %) | 0 | 0 | 1 | 9 | 35 |
| iso-C5+ yield (wt. %) | 8 | 8 | 31 | 53 | 52 |
| iso-C7 yield (wt. %) | 8 | 8 | 31 | 53 | 51 |

It is apparent from a comparison of the iso-C7 yield with the iso-C5+ yield shown in Tables 1 to 3 that the iso-C5+ is essentially composed of a branched saturated hydrocarbon having 7 carbon atoms (iso-C7) and the normal heptane (n-C7) was selectively and efficiently isomerized into a branched saturated hydrocarbon having the same number of carbon atoms as the number of the normal heptane by the above isomerization reaction.

INDUSTRIAL APPLICABILITY

As described above, according to the present invention, if a hydrocarbon raw material containing at least 50 wt. % of saturated hydrocarbons having 7 and 8 carbon atoms is subjected to an isomerization reaction using a specified catalyst, then the hydrocarbons having 7 and 8 carbon atoms in particular are efficiently isomerized into branched saturated hydrocarbons having the same number of carbon atoms and having a high octane number, and hence a gasoline base having a high octane number can be obtained at a high yield. As a result, the aromatic component in a gasoline can be reduced without bringing about a drop in the operational performance of gasoline engines.

The invention claimed is:

1. A method of isomerizing hydrocarbons, comprising the steps of:

contacting a hydrocarbon component containing at least 50 wt. % of saturated hydrocarbons having 7 and 8 carbon atoms and less than 10 wt. % of hydrocarbons having no more than 6 carbon atoms, in the presence of hydrogen, with a solid acid catalyst comprising a platinum group metal component supported on a carrier that contains as metal components, a zirconium metal component and a tungsten metal component, and further contains γ-alumina, and carrying out an isomerization reaction at a temperature in a range of 200-225° C.

2. The method of claim 1, wherein reaction products obtained from the isomerization reaction are separated into a first fraction predominantly containing branched hydrocarbons and a second fraction predominantly containing straight-chain hydrocarbons and the second fraction is recycled as a raw material.

3. The method of claim 1, wherein the isomerization reaction is carried out at a pressure in a range of 0.8-10 MPa.

4. The method of claim 1, wherein the solid acid catalyst has a specific surface area of 70-200 $m^2/g$, a pore volume of from 0.25-1.0 $cm^3/g$ for a pore diameter range of 0.002-10 μm and a median pore diameter of from 70-150 Å in a pore diameter range of 0.002-0.05 μm.

5. The method of claim 1, wherein the solid acid catalyst is obtained by kneading a precursor powder of zirconium oxide, a tungsten metal compound and a hydrated alumina to form a kneaded mixture, shaping the kneaded mixture, calcining the shaped mixture to form the carrier and supporting the platinum group metal component on the carrier.

6. The method of claim 1, wherein the isomerization reaction is carried out at a pressure of from 0.8-10 MPa, an LHSV of 0.2-10/hr and a hydrogen/hydrocarbon component of 0.01-10 mol/mol.

7. The method of claim 1, wherein the hydrocarbon component contains at least 70 wt. % of saturated hydrocarbons having 7 and 8 carbon atoms.

* * * * *